H. H. POULTER.
HARROW.
APPLICATION FILED DEC. 14, 1915.
1,188,827.
Patented June 27, 1916.
2 SHEETS—SHEET 2.
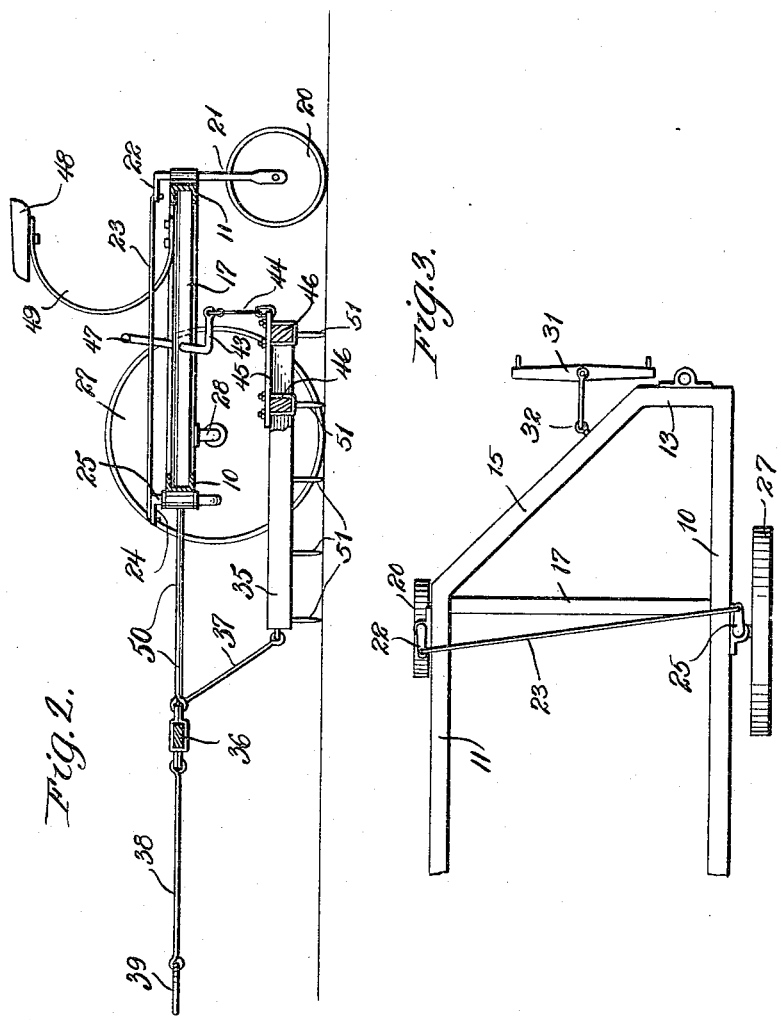
WITNESSES
INVENTOR
Hubert H. Poulter.
BY
ATTORNEY

UNITED STATES PATENT OFFICE.

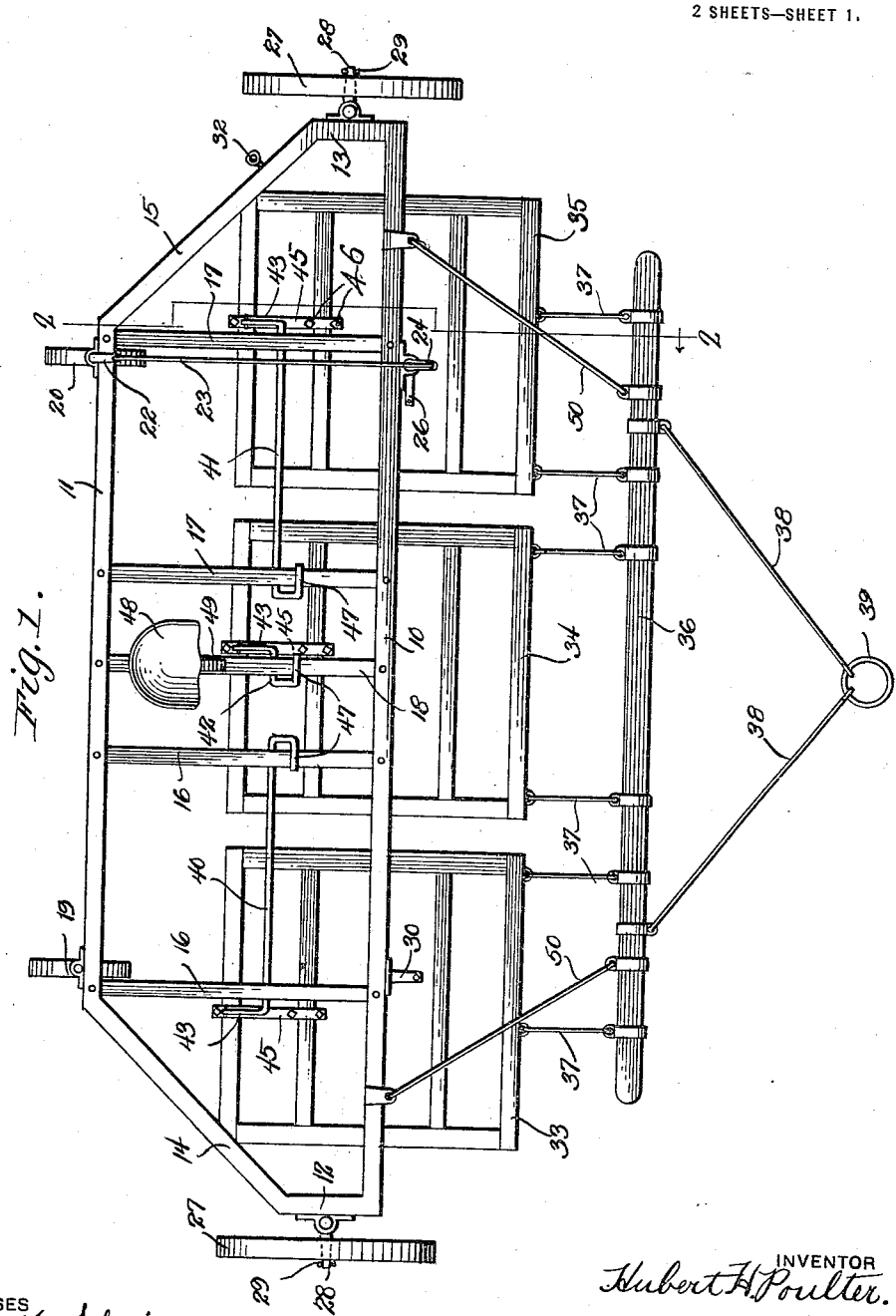

HUBERT H. POULTER, OF MILAN, MISSOURI.

HARROW.

1,188,827.  Specification of Letters Patent.  Patented June 27, 1916.

Application filed December 14, 1915. Serial No. 66,762.

*To all whom it may concern:*

Be it known that I, HUBERT H. POULTER, a citizen of the United States, residing at Milan, in the county of Sullivan and State of Missouri, have invented certain new and useful Improvements in Harrows, of which the following is a specification.

This invention relates to an improved harrow of the riding type and the principal object of the invention is to provide a harrow having improved means for connecting the harrow frames with the carriage and to also provide improved means for adjusting the harrow frames.

Another object of the invention is to provide improved means for connecting the harrow frames with the carriage so that they may be removed and placed upon the carriage when desired.

Another object of the invention is to provide improved means for mounting the wheels of the carriage.

Another object of the invention is to provide a riding harrow which will be comparatively simple in construction but at the same time will be strong and durable and may be easily operated.

This invention is illustrated in the accompanying drawings, wherein:—

Figure 1 is a top plan view of the improved harrow. Fig. 2 is a transverse vertical sectional view taken along the line 2—2 of Fig. 1. Fig. 3 is a fragmentary view in top plan of one end portion of the carriage as it would appear when being taken from one field to another.

The carriage of this harrow comprises a frame having the front and rear bars 10 and 11, the end bars 12 and 13 and the diagonal bars 14 and 15 which connect the rear bar 11 with the end bars 12 and 13. Cross bars 16, 17 and 18 connect the front bar 10 and rear bar 11 and not only serve to strengthen the frame but serve another purpose which will be hereinafter brought out.

The rear supporting wheels 19 and 20 are of the caster type, the shaft 21 of wheel 20 having its upper end portion bent to provide a short handle or lever 22 so that by turning the lever handle 22, the wheel 20 may be turned from the position shown in Figs. 1 and 2 to the position shown in Fig. 3. This lever handle 22 is connected with a rod or link 23 which extends transversely across the frame of the carriage and is connected with the lever handle 24 of the shank 25 of spindle 26. It will thus be seen that caster wheel 20 and the spindle 26 will move together. Wheels 27 are mounted upon spindles 28 and releasably held thereon by means of keys or other removable fasteners 29 so that when desired these wheels may be removed and placed upon the spindles 26 and 30. A swingle-tree 31 can then be connected with the eye 32 extending from bar 15 and the harrow can be readily drawn from one field to another. Of course when the machine is drawn from one field to another the caster wheel 19 will turn to extend in the proper direction.

The harrow frames 33, 34 and 35 are positioned beneath the carriage and are connected with the draw bar 36 by means of links or rods 37. Rods 38 extend from the draw bar 36 and are connected with the ring 39 to which the swingle-tree 31 or any other suitable draft equalizer may be connected. Rocker shafts 40, 41 and 42 are rotatably carried by the cross bars 16, 17 and 18 and have their rearwardly extending arms 43 connected with the links 44 which are connected with the strips 45 secured to the harrow frames by means of the U-bolts 46. The strips 45 will of course be releasably connected with the links 44 so that when desired the harrow frames may be disconnected from the rocker shafts. The opposite end portions of these rocker shafts are bent to provide foot levers or treadles 47 which are placed adjacent the seats 48 carried by the spring standards 49 secured to cross bar 18.

When this harrow is in use, the harrow frames are connected with the rocker shafts and with the draw bar 36 which is connected with the carriage by means of rods or links 50. The wheels 27 are mounted upon spindles 28 and the rear wheels 19 and 20 are in the position shown in Fig. 1. The draft equalizer will be connected with ring 39 and the harrow can be drawn across the field. As the teeth 51 break up the ground, the dirt will have a tendency to gather beneath the harrow frame and when this occurs, the proper foot lever 47 will be pressed. This will cause the harrow frame with which the foot lever is connected to be raised and let the accumulated dirt pass beneath the harrow frame. The lever will then be released and the teeth will again come in contact with the soil.

When moving the machine from one field to another, the harrow frames will be disconnected from the actuating levers or rocker shafts and the rods 50 will be disconnected from the draw bar 36. The wheels 27 will be removed from spindles 28 and placed upon spindles 26 and 30. The wheels will then extend longitudinally of the carriage instead of transversely thereof and after the harrow frames have been placed upon the carriage, the swingle-tree or other draft equalizer can be connected with eye 32 and the machine drawn to another field or if it is no longer desired to use the machine, it can be conveyed to the barn or other place where it is to be stored.

It will thus be seen that with this machine the harrow frames can be disconnected from the carriage and placed upon the carriage so that the machine can be easily conveyed to another field or to a place of storage and it will be further seen that when in use, the harrow will be so constructed that the frames may be raised out of engagement with the ground thus permitting accumulated dirt to pass beneath the harrow frame and thus seed in the ground prevented from being disturbed and the principal part of the seed swept into one place by the accumulated dirt.

It will be further noted that the harrow is of a very simple construction but at the same time will be strong and durable since all of the parts are strong and not of a complicated construction.

It should be further noted that if any portion of the machine should break, it could be very easily repaired or replaced thus making the up-keep of the machine inexpensive.

What is claimed is:—

1. A riding harrow comprising a carriage, supporting wheels removably connected with said carriage, casters connected with said carriage, one of said casters being provided with a lever arm, spindles for said carriage, one of said spindles being pivotally mounted and provided with a lever arm, a rod connecting the lever arm of said spindle with the lever arm of said caster, said wheels when removed being mounted upon said spindles, and a harrow frame extending beneath said carriage.

2. An agricultural implement comprising a carriage, supporting wheels removably connected with said carriage, casters connected with said carriage, spindles carried by said carriage, one of said spindles being pivotally mounted, means connecting the pivoted spindle with the caster for turning the spindle with the caster, said wheels when removed being mounted upon said spindles, and an operating element connected with said carriage.

In testimony whereof I affix my signature in presence of two witnesses.

HUBERT H. POULTER.

Witnesses:
   Mrs. Roy Cluck,
   Etta B. Riley.

Copies of this patent may be obtained for five cents each, by addressing the "Commissioner of Patents, Washington, D. C."